United States Patent
Eto et al.

(10) Patent No.: US 12,166,371 B2
(45) Date of Patent: *Dec. 10, 2024

(54) BATTERY CHARGE DIFFERENCE CALCULATION SYSTEM

(71) Applicant: HONDA MOTOR CO., LTD., Tokyo (JP)

(72) Inventors: Masashi Eto, Wako (JP); Takeshi Matsumoto, Wako (JP); Daiko Tsutsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 18/115,010

(22) Filed: Feb. 28, 2023

(65) Prior Publication Data

US 2023/0299605 A1 Sep. 21, 2023

(30) Foreign Application Priority Data

Mar. 17, 2022 (JP) ................................ 2022-042325

(51) Int. Cl.
  *H02J 7/00* (2006.01)
  *B60L 50/60* (2019.01)
  *B64D 27/24* (2024.01)

(52) U.S. Cl.
  CPC ........ *H02J 7/007182* (2020.01); *B60L 50/60* (2019.02); *B64D 27/24* (2013.01);
  (Continued)

(58) Field of Classification Search
  CPC .. H02J 7/007182; H02J 7/0014; H02J 7/0063; B60L 50/60; B60L 2200/10; B64D 27/24
  (Continued)

(56) References Cited

U.S. PATENT DOCUMENTS 11,476,704 B2 * 10/2022 Takahashi ............... H02J 9/068
11,845,351 B2 * 12/2023 Gurusamy ........ H02J 13/00002
(Continued)

FOREIGN PATENT DOCUMENTS

JP 2000-324871 11/2000

OTHER PUBLICATIONS

Non-Final Office Action for U.S. Appl. No. 18/101,587 dated May 9, 2024.
(Continued)

*Primary Examiner* — Michael R. Fin
(74) *Attorney, Agent, or Firm* — Amin, Turocy & Watson, LLP (57) ABSTRACT

A power supply device includes a power generator, a drive source, a plurality of power supply lines, a plurality of batteries, a diode, a difference calculating unit 11, 12, 13, or 14, and a difference summing unit 16. The difference calculating unit 11, 12, 13, or 14 is configured to calculate a difference between demanded electric power P1, P2, P3, or P4 in the corresponding power supply line and a charge state of the corresponding battery. The difference summing unit 16 is configured to sum the differences in electric power in the power supply lines calculated by the difference calculating units 11, 12, 13, and 14. In the power supply device, the drive source is controlled such that electric power equal to or higher than the electric power calculated by the difference summing unit 16 is generated by the power generator.

4 Claims, 4 Drawing Sheets

(52) U.S. Cl.
CPC .......... *H02J 7/0014* (2013.01); *H02J 7/0063* (2013.01); *B60L 2200/10* (2013.01)

(58) Field of Classification Search
USPC .......................................................... 307/9.1
See application file for complete search history.

(56) References Cited

U.S. PATENT DOCUMENTS

| | | | |
|---|---|---|---|
| 2014/0097290 A1* | 4/2014 | Leng ................. | B60L 50/52 |
| | | | 244/6 |
| 2018/0198176 A1 | 7/2018 | Isogai et al. | |
| 2023/0294834 A1 | 9/2023 | Matsumoto | |
| 2023/0294837 A1* | 9/2023 | Matsumoto ........... | H02J 7/1415 |
| | | | 244/62 |
| 2023/0299605 A1* | 9/2023 | Eto ..................... | B64D 27/357 |
| | | | 307/9.1 |

OTHER PUBLICATIONS

Non-Final Office Action for U.S. Appl. No. 18/105,261 dated May 10, 2024.

* cited by examiner

BATTERY CHARGE DIFFERENCE CALCULATION SYSTEM

CROSS-REFERENCE TO RELATED APPLICATION

Priority is claimed on Japanese Patent Application No. 2022-042325, filed Mar. 17, 2022, the content of which is incorporated herein by reference.

BACKGROUND OF THE INVENTION

Field of the Invention

The present disclosure relates to a power supply device.

Description of Related Art

In the related art, for example, a power supply device including a drive source, a power generator, a plurality of batteries, and a motor that is driven with electric power from the power generator or the batteries in a power supply device of an aircraft or the like is known. In such a power supply device, various techniques for improving battery performance by controlling charging modes of the batteries have been proposed.

For example, Patent Document 1 (Japanese Unexamined Patent Application, First Publication No. 2000-324871) discloses a configuration of a power supply device including a prior battery current command determining unit configured to detect respective charge states of a plurality of batteries and to determine the priority order of supply electric power to the batteries based on the detected respective charge states of the batteries. By preferentially controlling two command values of a current command value of a high-voltage battery out of the plurality of batteries, a current command value of a low-voltage battery, and a torque command value of a torque needed for driving a motor, the prior battery current command determining unit subordinately controls the other one.

Accordingly, with the technique described in Patent Document 1, it is possible to achieve equalization of the respective charge states of the batteries and to improve battery performance.

SUMMARY OF THE INVENTION

However, in the technique described in Patent Document 1, distribution proportions of electric power to the batteries are determined based on the respective charge states of the batteries. That is, since it is necessary to calculate electric power demanded for each battery and to additionally determine the priority order, there is concern about complication in configuration of a control device. Since a device that transmits and receives electric power between the plurality of batteries is used, there is concern about an increase in size of the control device. Since precise control is needed for convergence of the respective charge states of the batteries on a predetermined value, control is more complicated. Accordingly, there is concern about an increase in cost of a control device and an increase in size of the power supply device as a whole.

Therefore, an objective of the present invention is to provide a power supply device that can curb an increase in size in comparison with the related art and equalize power consumption in a plurality of batteries.

In order to achieve the aforementioned objective, a power supply device according to the present invention employs the following configurations.

(1) According to an aspect of the present invention, there is provided a power supply device including: a power generator; a drive source that drives the power generator; a plurality of power supply lines that supply electric power generated by the power generator to a plurality of electric loads; a plurality of batteries that are connected to the corresponding power supply lines upstream from the corresponding electric loads in an electric power supply direction; a diode that is provided upstream from the battery in the corresponding power supply line and allows electric power to flow in only one direction from upstream to downstream of the power supply line; a difference calculating unit configured to calculate a difference between demanded electric power in the corresponding power supply line and a charge state of the corresponding battery; and a difference summing unit configured to sum the differences in electric power in the power supply lines calculated by the difference calculating unit, wherein the drive source is controlled such that electric power equal to or higher than the electric power calculated by the difference summing unit is generated by the power generator.

(2) The power supply device according to the aspect of (1) may further include: a temporary generated electric power determining unit configured to calculate an amount of electric power generated by the power generator based on the respective charge states of the plurality of batteries and the demanded electric power; and a comparison unit configured to compare first electric power calculated by the difference summing unit and second electric power calculated by the temporary generated electric power determining unit and to select the higher electric power of the first electric power and the second electric power, and the drive source may be controlled such that electric power equal to or higher than the electric power selected by the comparison unit is generated by the power generator.

(3) In the power supply device according to the aspect of (1) or (2), the power supply device may be a power supply of an electric propulsion flying object, and the electric loads may be electric motors for causing propellers of the flying object to rotate.

According to the aspect of (1), in each power supply line, electric power generated by the power generator flows in one direction through the diode and is supplied to the corresponding battery. The power supply device includes the difference calculating unit and the difference summing unit, and the drive source is controlled such that electric power equal to or higher than the electric power calculated by the difference summing unit is generated by the power generator. Accordingly, it is possible to supply electric power from the power generator to the batteries according to the respective charge states of the batteries without complicating a control system. As a result, it is possible to equalize the respective charge states of the batteries and to curb occurrence of a difference in power consumption or charge state between the batteries. By equalizing the power consumption in the plurality of batteries, for example, it is possible to prevent other batteries from being increased in size to conform with a battery with higher power consumption in comparison with the related art in which one battery out of a plurality of batteries has higher power consumption. That is, it is possible to curb an increase in size of the batteries as a whole. Since capacities of the batteries can be efficiently used, it is possible to decrease the battery size.

Accordingly, it is possible to provide a power supply device that can curb an increase in size in comparison with the related art and equalize power consumption in a plurality of batteries.

According to the aspect of (2), the power supply device further includes the temporary generated electric power determining unit and the comparison unit. The higher electric power of the first electric power calculated by the difference summing unit and the second electric power calculated by the temporary generated electric power determining unit is generated by the power generator. For example, when a sum of differences between demanded electric power and the respective charge states of the batteries is large, electric power to be generated is determined based on the first electric power calculated by the difference summing unit. Accordingly, when a difference in demanded electric power between the power supply lines is large or when a difference in charge state between the batteries is large, electric power to be generated can be suitably determined. On the other hand, for example, when a total amount of demanded electric power is large or when a total charge state of the batteries is low, electric power to be generated is determined based on the second electric power calculated by the temporary generated electric power determining unit. Accordingly, it is possible to perform control with a margin in electric power. As a result, it is possible to provide a power supply device with improved versatility which can be applied to various circumstances without complicating the control.

According to the aspect of (3), the power supply device is used as a power supply of an electric propulsion flying object. Here, in a flying object that flies by causing a plurality of propellers to rotate, unevenness in power consumption of the power supply lines is likely to increase, for example, according to the weather or a posture of the flying object. Accordingly, particularly, when the power supply device is applied to a flying object with a large difference in demanded electric power between electric loads (propellers), the power supply device can be more suitably used. That is, it is possible to equalize power consumption or respective charge states of the batteries.

Since electric power from the power generator is distributed according to electric power used for the power supply lines, it is possible to easily control the flying object.

DETAILED DESCRIPTION OF THE INVENTION

Hereinafter, an embodiment of the present invention will be described with reference to the accompanying drawings.
(Flying Object)

Figure 1:
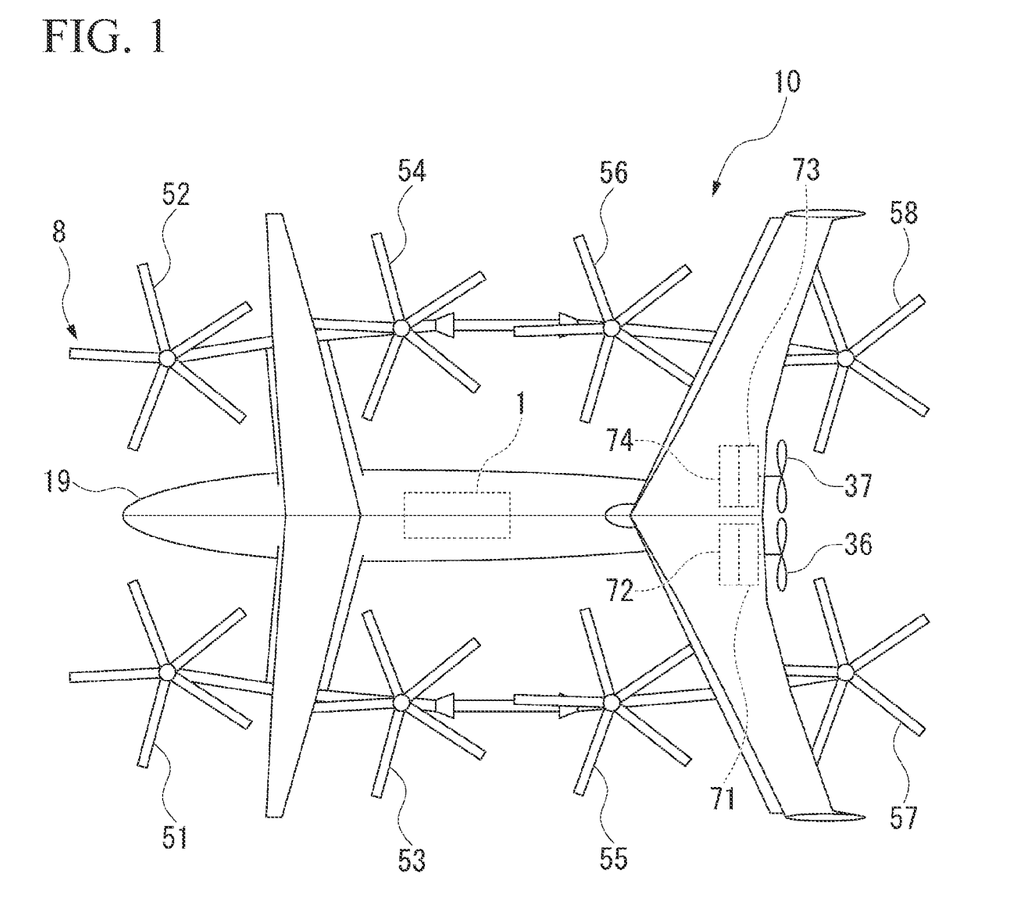
FIG. 1 is a diagram showing appearance of a flying object in which a power supply device according to an embodiment is mounted.

FIG. 1 is a diagram showing appearance of a flying object 10 in which a power supply device 1 according to an embodiment is mounted.

The flying object 10 is, for example, an electric propulsion aircraft that flies by rotating a plurality of propellers 8. The flying object 10 includes an airframe 19 and a power supply device 1.

In this embodiment, eight propellers (rotors) 51, 52, 53, 54, 55, 56, 57, and 58 facing downward and two propulsion propellers 36 and 37 facing rearward are attached to the airframe 19. In the following description, the plurality of propellers 51, 52, 53, 54, 55, 56, 57, and 58 may be referred to as propellers 8 when they are not distinguished from each other.

Each propeller 8 is attached to the airframe 19 via an attachment member which is not shown. An electric motor 7 (see FIG. 2) is attached to a base (a rotation shaft) of a base of the propeller 8. The electric motor 7 drives the propeller 8. The electric motor 7 is, for example, a brushless DC motor. Each propeller 8 is a fixed wing with blades rotating around an axis parallel to the gravitational direction when the flying object 10 takes a horizontal posture.

The propulsion propellers 36 and 37 are attached to the rear of the flying object 10. The propulsion propellers 36 and 37 are attached to the airframe 19 via attachment members which are not shown. Electric motors 7 (see FIG. 2) that drive the propulsion propellers 36 and 37 are attached to bases (rotation shafts) of the propulsion propellers 36 and 37. The propulsion propellers 36 and 37 are fixed wings with blades rotating around an axis crossing the gravitational direction (for example, an axis parallel to a longitudinal direction of the flying object 10) when the flying object 10 takes a horizontal posture.

By causing the propellers 8 and the propulsion propellers 36 and 37 to rotate according to a control signal, the flying object 10 flies in a desired flight state. The control signal is a signal for controlling the flying object 10 based on an operator's operation or an instruction in automatic driving. For example, when the propellers 51, 54, 55, and 58 rotate in a first direction (for example, a clockwise direction) and the propellers 52, 53, 56, and 57 rotate in a second direction (for example, a counterclockwise direction), the flying object 10 flies.

Figure 2:
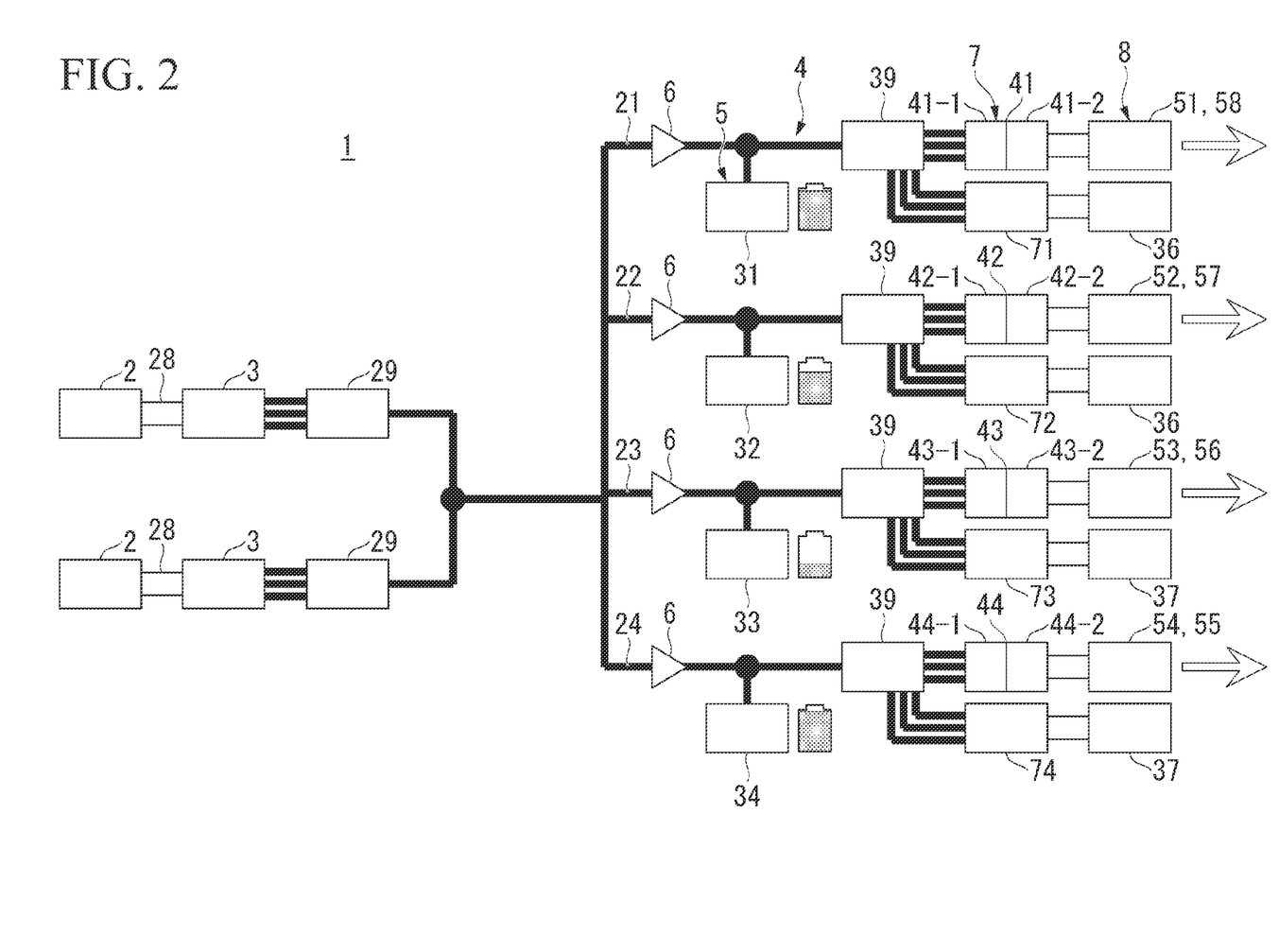
FIG. 2 is a diagram schematically showing a configuration of the power supply device according to the embodiment.

FIG. 2 is a diagram schematically showing a configuration of the power supply device 1 according to the embodiment.

As shown in FIG. 2, the power supply device 1 is mounted in the aforementioned flying object 10. The power supply device 1 is used as a power supply of the flying object 10. The power supply device 1 includes a drive source 2, a power generator 3, a plurality of power supply lines 4, a plurality of batteries 5, a diode 6, an electric motor 7 (an electric load in the claims), the propellers 8, and a control unit 9 (see FIG. 3).
(Drive Source)

The drive source 2 is a so-called gas turbine engine. A plurality of (two in this embodiment) drive sources 2 are provided. Since the two drive sources 2 have the same configuration, one drive source 2 will be exemplified in the following description. The drive source 2 includes a compressor, a turbine, and a rotation shaft that connects the compressor and the turbine (all of which are not shown). The compressor compresses intake air taken via an intake port (not shown) provided in the airframe of the flying object 10. The turbine is connected to the compressor and rotates along with the compressor. A starter motor is connected to the drive source 2. When the drive source 2 starts, the starter motor is first driven with electric power from the batteries 5 which will be described later. Accordingly, the drive source 2 starts with a rotational force transmitted from the starter motor.

(Power Generator)

A number of (two in this embodiment) power generators 3 corresponding to the number of drive sources 2 are provided. Since the two power generators 3 have the same configuration, one power generator 3 will be exemplified in the following description. The power generator 3 is connected to the drive source 2 via a transmission shaft 28 and a reduction gear mechanism (not shown). The power generator 3 is disposed on the turbine side in an axial direction of the drive source 2. The power generator 3 is provided on the same axis as the drive source 2. The power generator 3 generates electric power (AC electric power) with driving of the drive source 2. The AC electric power generated by the power generator 3 is converted to DC electric power by a converter 29 of a power drive unit (PDU) which is not shown and is stored in the batteries 5 via the power supply lines 4.

(Power Supply Line)

The power supply lines 4 are connected to the plurality of power generators 3 via the converter 29. The power supply lines 4 supply electric power generated by the power generator 3 to a plurality of electric motors 7 (electric loads). A plurality of (four in this embodiment) power supply lines 4 are provided. Electric power generated by the power generators 3 is combined once and then is distributed and supplied to the four power supply lines 21, 22, 23, and 24 at predetermined proportions in accordance with a signal from the control unit 9 (see FIG. 3). Specifically, electric power generated by the power generator 3 is preferentially supplied to the battery 5 with a lower charge state out of the batteries 5 provided in the power supply lines 4. Particularly, when the voltage of the diode 6 is changed using the electric power of the battery 5, the battery 5 with a lower voltage is supplied with a preferential (larger) amount of electric power. The power supply lines 4 include a first power supply line 21, a second power supply line 22, a third power supply line 23, and a fourth power supply line 24. The diode 6, the electric motor 7, and predetermined propellers 8 are connected to each power supply line 4.

The first power supply line 21 is used as the power supply line 4 for driving the first propeller 51 and the eighth propeller 58 of the eight propellers 8 and the propulsion propeller 36. In other words, the first propeller 51, the eighth propeller 58, and the propulsion propeller 36 are driven with electric power supplied to the first power supply line 21.

The second power supply line 22 is used as the power supply line 4 for driving the second propeller 52 and the seventh propeller 57 of the eight propellers 8 and the propulsion propeller 36. In other words, the second propeller 52, the seventh propeller 57, and the propulsion propeller 36 are driven with electric power supplied to the second power supply line 22.

The third power supply line 23 is used as the power supply line 4 for driving the third propeller 53 and the sixth propeller 56 of the eight propellers 8 and the propulsion propeller 37. In other words, the third propeller 53, the sixth propeller 56, and the propulsion propeller 37 are driven with electric power supplied to the third power supply line 23.

The fourth power supply line 24 is used as the power supply line 4 for driving the fourth propeller 54 and the fifth propeller 55 of the eight propellers 8 and the propulsion propeller 37. In other words, the fourth propeller 54, the fifth propeller 55, and the propulsion propeller 37 are driven with electric power supplied to the fourth power supply line 24.

(Battery)

The battery 5 is provided for each power supply line 4. A plurality of (four in this embodiment) batteries 5 are provided. Specifically, the batteries 5 include a first battery 31, a second battery 32, a third battery 33, and a fourth battery 34. The first battery 31 is provided in the first power supply line 21. The second battery 32 is provided in the second power supply line 22. The third battery 33 is provided in the third power supply line 23. The fourth battery 34 is provided in the fourth power supply line 24. Each battery 5 is provided upstream from the corresponding electric motor 7 in an electric power supply direction. The batteries 5 have the same capacity and the same configuration. Since demanded electric power or power consumption varies depending on the power supply lines 4, the charge state and the power consumption of each battery 5 are not constant.

(Diode)

The diode 6 is provided for each power supply line 4. That is, a plurality of (four in this embodiment) diodes 6 are provided. Each diode 6 is provided upstream from the corresponding battery 5 in the electric power supply direction in the corresponding power supply line 4. The diode 6 uses electric power of the battery 5 provided in the corresponding power supply line 4. That is, when a voltage of the battery 5 decreases, a voltage of the diode 6 provided in the same power supply line 4 as the battery 5 also decreases. Accordingly, the power supply line 4 including the diode 6 with a lower voltage is preferentially supplied with electric power from the power generator. Basically, the diode 6 allows electric power to flow in only one direction from upstream to downstream of the corresponding power supply line 4. In other words, the diode 6 cuts off a reverser flow of electric power from the battery 5. Accordingly, in a state in which electric power is being generated by the power generator 3, supply and reception of electric power between the plurality of batteries 5 are not performed.

On the other hand, the diode 6 allows electric power to flow from downstream to upstream of the corresponding power supply line 4 in accordance with a control signal when the drive source 2 starts. Accordingly, it is possible to drive the starter motor connected to the drive source 2 using electric power from the battery 5.

(Electric Motor)

The electric motor 7 is provided for each of the power supply line 4. The electric motor 7 is connected to the corresponding battery 5 via an inverter 39. Specifically, the first electric motors 41 (More specifically, the first electric motors 41-1 and 41-2) are provided in the first power supply line 21. The second electric motors 42 (More specifically, the second electric motors 42-1 and 42-2) are provided in the second power supply line 22. The third electric motors 43 (More specifically, the third electric motors 43-1 and 43-2) are provided in the third power supply line 23. The fourth electric motors 44 (More specifically, the fourth electric motors 44-1 and 44-2) are provided in the fourth power supply line 24. Thus, in this embodiment, each power supply line 4 has two electric motors 7. Each electric motor 7 is provided downstream from the corresponding battery 5 in the electric power supply direction. Each electric motor 7 causes the propellers 8 of the flying object 10 to rotate using electric power of at least one of electric power from the power generator 3 and electric power from the battery 5. The electric motors 7 have the same configuration.

The electric motors 7 further include four propulsion electric motors 71, 72, 73, and 74. The propulsion electric motor 71 is provided in the first power supply line 21. The propulsion electric motor 72 is provided in the second power supply line 22. The propulsion electric motor 73 is provided in the third power supply line 23. The propulsion electric motor 74 is provided in the fourth power supply line 24. The propulsion electric motors 71 and 72 cause the propulsion propeller 36 to rotate. The propulsion electric motors 73 and 74 cause the propulsion propeller 37 to rotate.

(Propeller)

The propellers 8 are connected to the predetermined electric motors 7. The propellers 8 are driven with electric power from the predetermined power supply lines 4.

As described above, the first propeller 51 and the eighth propeller 58 are connected to the first electric motor 41 and rotate around a rotation axis with driving of the first electric motor 41. Specifically, the first propeller 51 is connected to the first electric motor 41-1 and the eighth propeller 58 is connected to the first electric motor 41-2. The second propeller 52 and the seventh propeller 57 are connected to the second electric motor 42 and rotate around a rotation axis with driving of the second electric motor 42. Specifically, the second propeller 52 is connected to the second electric motor 42-1 and the seventh propeller 57 is connected to the second electric motor 42-2. The third propeller 53 and the sixth propeller 56 are connected to the third electric motor 43 and rotate around a rotation axis with driving of the third electric motor 43. Specifically, the third propeller 53 is connected to the third electric motor 43-1 and the sixth propeller 56 is connected to the third electric motor 43-2. The fourth propeller 54 and the fifth propeller 55 are connected to the fourth electric motor 44 and rotate around a rotation axis with driving of the fourth electric motor 44. Specifically, the fourth propeller 54 is connected to the fourth electric motor 44-1 and the fifth propeller 55 is connected to the fourth electric motor 44-2.

The propulsion propeller 36 is connected to the propulsion electric motors 71 and 72. The propulsion propeller 36 rotates with driving of the propulsion electric motors 71 and 72 to generate a propulsion force in the horizontal direction.

The propulsion propeller 37 is connected to the propulsion electric motors 73 and 74. The propulsion propeller 37 rotates with driving of the propulsion electric motors 73 and 74 to generate a propulsion force in the horizontal direction.

(Control Unit)

The control unit 9 (see FIG. 3) controls electric power generated by the power generator 3 by controlling an output of the gas turbine engine. In the following description, control when electric power generated by the power generator 3 is determined based on demanded electric power, respective charge states of the batteries 5, or the like in response to an output request for the electric motors 7 (the propellers 8) will be described. The control unit 9 may also perform various types of control, for example, when power generation is not performed by the power generator 3 or when the flying object 10 is landing, taking off, or cruising.

Figure 3:
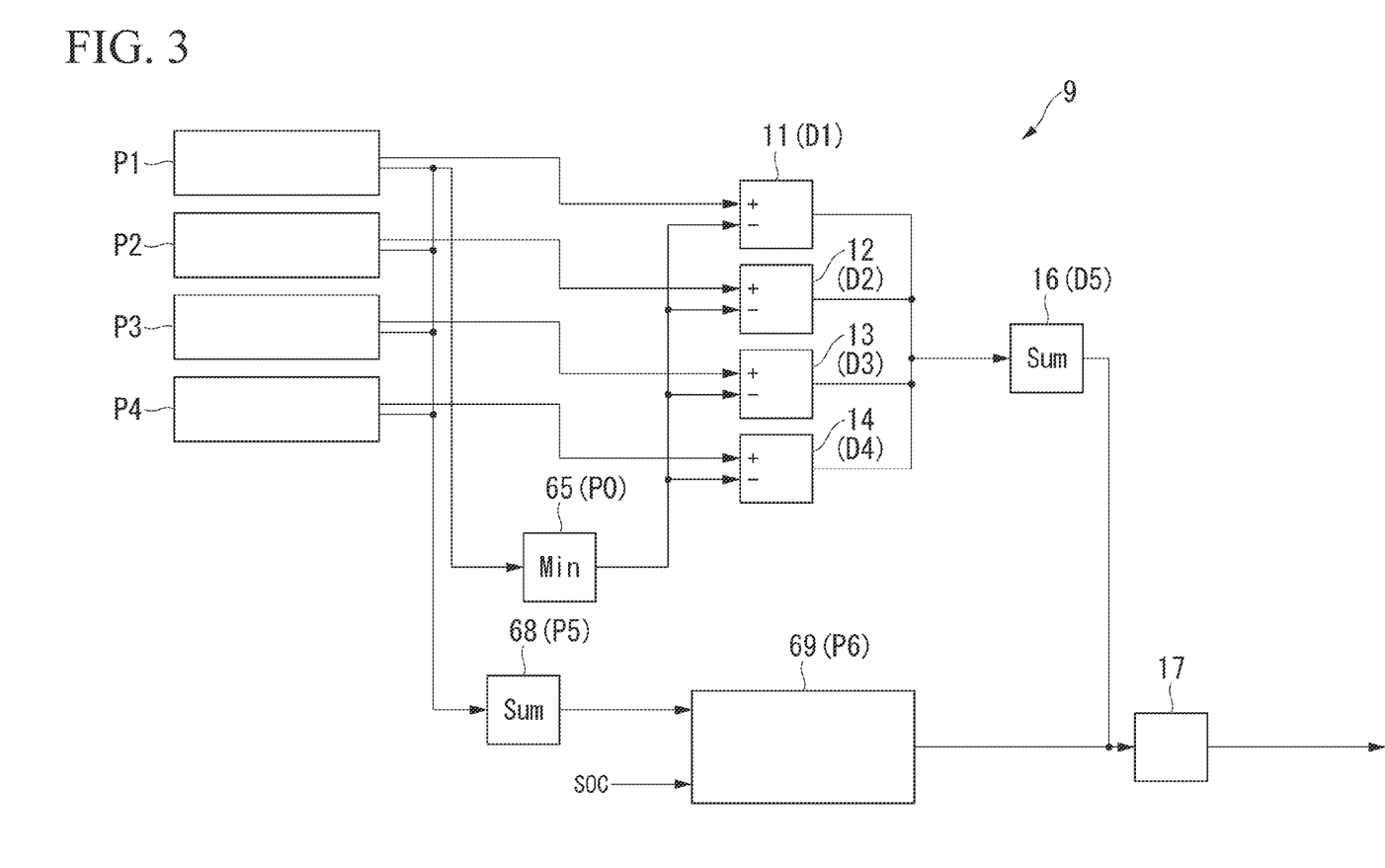
FIG. 3 is a block diagram showing control blocks of the power supply device according to the embodiment.
Figure 4:
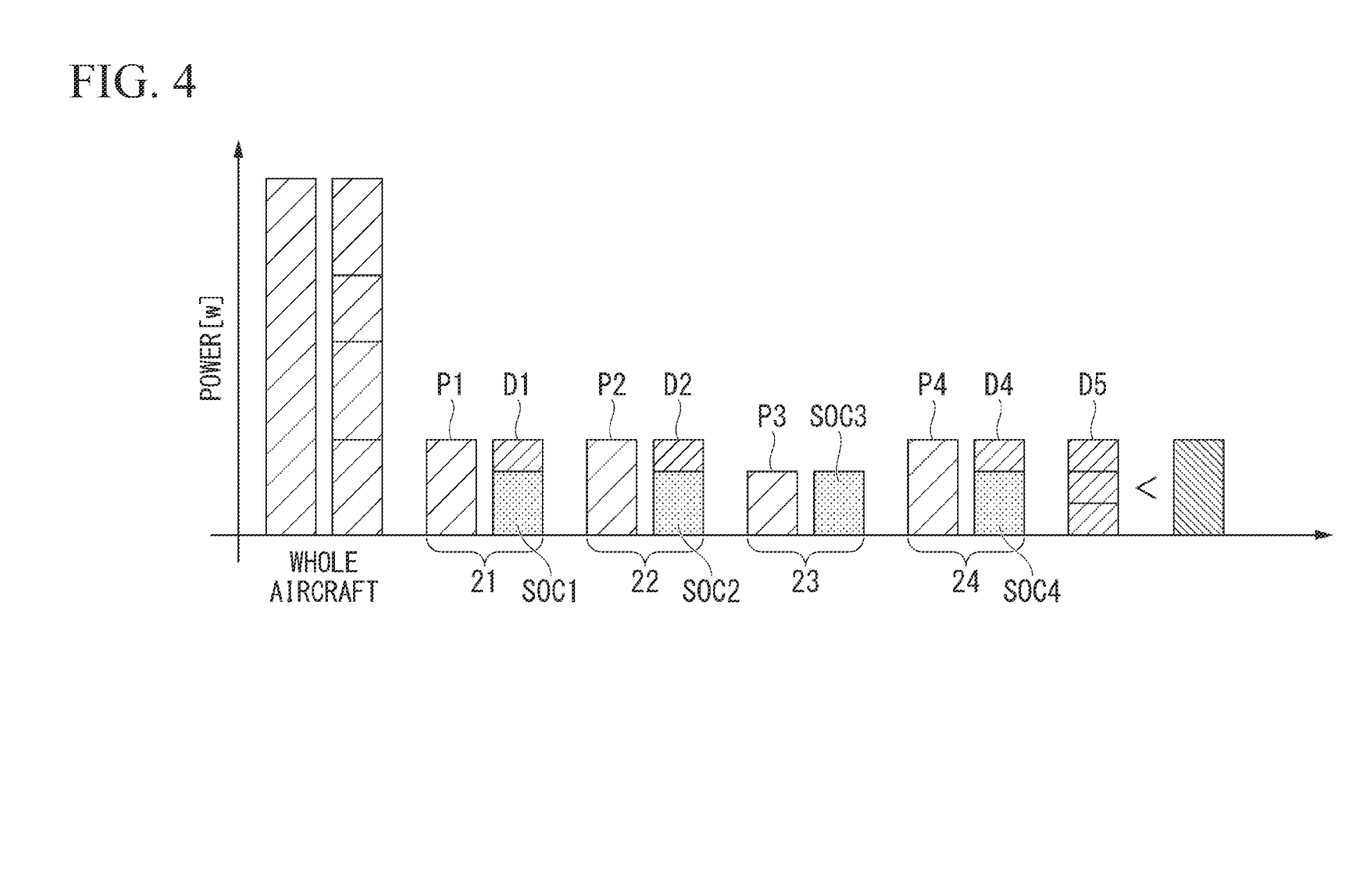
FIG. 4 is a graph showing electric power of power supply lines in the power supply device according to the embodiment.

FIG. 3 is a block diagram showing control blocks of the power supply device 1 according to the embodiment. FIG. 4 is a graph showing electric power of the power supply lines 4 in the power supply device 1 according to the embodiment. The vertical axis of FIG. 4 represents a magnitude of electric power. Hatched graphs in FIG. 4 represent demanded electric power P1, P2, P3, and P4. Dotted graphs in FIG. 4 represent the respective charge states SOC1, SOC2, SOC3, and SOC4 in the batteries 5. In FIG. 4, two graphs at the left end represent the demanded electric power (total amount) in the airframe as a whole. Two graphs on the right thereof represent the demanded electric power P1 in the first power supply line 21 and the charge state SOC1 in the first battery 31. Two graphs on the right thereof represent the demanded electric power P2 in the second power supply line 22 and the charge state SOC2 in the second battery 32. Two graphs on the right thereof represent the demanded electric power P3 in the third power supply line 23 and the charge state SOC3 in the third battery 33. Two graphs on the right thereof represent the demanded electric power P4 in the fourth power supply line 24 and the charge state SOC4 in the fourth battery 34. A graph on the right thereof represents a sum of differences (an electric power difference sum D5) between the demanded electric power and the respective charge states in the batteries 5. A graph at the right end represents electric power to be generated by the power generators 3.

As shown in FIG. 3, the control unit 9 includes a minimum value detecting unit 65, a load summing unit 68, difference calculating units 11, 12, 13, and 14, a difference summing unit 16, a temporary generated electric power determining unit 69, and a comparison unit 17. The control unit 9 detects demanded electric power P1, P2, P3, and P4 (see FIG. 4) for the electric motors 7 of the power supply lines 4.

As shown in FIGS. 3 and 4, first demanded electric power P1 is demanded electric power for the first electric motor 41 of the first power supply line 21. Second demanded electric power P2 is demanded electric power for the second electric motor 42 of the second power supply line 22. Third demanded electric power P3 is demanded electric power for the third electric motor 43 of the third power supply line 23. Fourth demanded electric power P4 is demanded electric power for the fourth electric motor 44 of the fourth power supply line 24.

As shown in FIG. 3, the minimum value detecting unit 65 detects minimum demanded electric power P0 out of the demanded electric power in the power supply lines 4. The minimum value detecting unit 65 detects a minimum value out of the first demanded electric power P1, the second demanded electric power P2, the third demanded electric power P3, and the fourth demanded electric power P4. In the example shown in FIG. 4, the value of the third demanded electric power P3 is the minimum demanded electric power (P3=P0).

The load summing unit 68 calculates total electric power P5 by summing the demanded electric power in the power supply lines 4. The load summing unit 68 calculates the total electric power P5 by summing the values of the first demanded electric power P1, the second demanded electric power P2, the third demanded electric power P3, and the fourth demanded electric power P4 (P5=P1+P2+P3+P4).

The difference calculating units 11, 12, 13, and 14 calculate differences between the demanded electric power in the power supply lines 4 and the respective charge states of the batteries 5. Specifically, the first difference calculating unit 11 calculates a first electric power difference D1 which is a difference between the minimum demanded electric power P0 detected by the minimum value detecting unit 65 and the charge state SOC1 of the first battery 31 (D1=SOC1−P0).

The second difference calculating unit 12 calculates a second electric power difference D2 which is a difference between the minimum demanded electric power P0 detected by the minimum value detecting unit 65 and the charge state SOC2 of the second battery 32 (D2=SOC2−P0).

The third difference calculating unit 13 calculates a third electric power difference D3 which is a difference between the minimum demanded electric power P0 detected by the minimum value detecting unit 65 and the charge state SOC3 of the third battery 33 (D3=SOC3−P0).

The fourth difference calculating unit 14 calculates a fourth electric power difference D4 which is a difference between the minimum demanded electric power P0 detected by the minimum value detecting unit 65 and the charge state SOC4 of the fourth battery 34 (D4=SOC4−P0).

The difference summing unit 16 calculates an electric power difference sum D5 by summing the differences in electric power in the power supply lines 4 calculated by the difference calculating unit. The difference summing unit 16 calculates the electric power difference sum D5 by summing the values of the first electric power difference D1, the second electric power difference D2, the third electric power difference D3, and the fourth electric power difference D4 (D5=D1+D2+D3+D4).

The temporary generated electric power determining unit 69 calculates temporary electric power P6 based on the respective charge states SOC1, SOC2, SOC3, and SOC4 of the plurality of batteries 5 and the demanded electric power P1, P2, P3, and P4. The temporary electric power P6 is a value which is obtained by hypothetically determining a target amount of electric power generated by the power generator 3. It is preferable that the temporary electric power P6 be calculated using parameters, functions, or the like different from those used by the difference calculating units 11, 12, 13, and 14 and the difference summing unit 16. Accordingly, the electric power difference sum D5 calculated by the difference summing unit 16 and the temporary electric power P6 calculated by the temporary generated electric power determining unit 69 may be different values.

The comparison unit 17 compares the electric power difference sum D5 (first electric power in the claims) calculated by the difference summing unit 16 and the temporary electric power P6 (second electric power in the claims) calculated by the temporary generated electric power determining unit 69. The comparison unit 17 selects the higher electric power of the electric power difference sum D5 and the temporary electric power P6. The comparison unit 17 sets the selected electric power as reference generated electric power.

The control unit 9 controls the drive sources 2 such that electric power equal to or higher than the reference generated electric power set by the comparison unit 17 is generated by the power generator 3 (see FIG. 4). In this embodiment, target generated electric power is set by adding a predetermined amount to the reference generated electric power, and the drive source 2 is controlled such that an amount of electric power generated by the power generator 3 reaches the target generated electric power. In other words, the control unit 9 controls the drive source 2 such that electric power equal to or higher than at least the electric power set by the difference summing unit 16 is generated by the power generator 3.

The electric power equal to or higher than the reference generated electric power (for example, the target generated electric power) is specifically electric power of a magnitude equal to or greater than the reference generated electric power selected by the comparison unit 17 and equal to or lower than an upper limit of the electric power which can be generated by the power generator 3.

Modified Example of Embodiment

A modified example of the aforementioned embodiment will be described below.

In a modified example, the control unit 9 may control the drive source 2, for example, such that electric power equal to or higher than the electric power calculated by the difference summing unit 16 is generated by the power generator 3 (see FIG. 4). In this case, the comparison unit 17 may be omitted. Specifically, in the modified example, the electric power difference sum D5 calculated by the difference summing unit 16 may be set as the reference generated electric power and the target generated electric power may be set by adding a predetermined amount to the electric power difference sum D5. The control unit 9 controls the drive source 2 such that an amount of electric power generated by the power generator 3 reaches the target generated electric power. As in the aforementioned embodiment, the electric power equal to or higher than the electric power calculated by the difference summing unit 16 (the target generated electric power) in the modified example is electric power of a magnitude equal to or higher than the electric power difference sum D5 and equal to or lower than the upper limit of electric power which can be generated by the power generator 3.

Operations and Advantages

Operations and advantages of the power supply device 1 will be described below.

In each power supply line 4 of the power supply device 1 according to this embodiment, electric power generated by the power generator 3 flows in one direction through the diode 6 and is supplied to the corresponding battery 5. The power supply device 1 includes the difference calculating units 11, 12, 13, and 14 and the difference summing unit 16, and the drive source 2 is controlled such that electric power equal to or higher than the electric power calculated by the difference summing unit 16 is generated by the power generator 3. Accordingly, it is possible to supply electric power from the power generator 3 to the batteries 5 according to the respective charge states of the batteries 5 without complicating a control system. As a result, it is possible to equalize the respective charge states of the batteries 5 and to curb occurrence of a difference in power consumption or charge state between the batteries 5. By equalizing the power consumption in the plurality of batteries 5, for example, it is possible to prevent other batteries 5 from being increased in size to conform with a battery 5 with higher power consumption in comparison with the related art in which one battery 5 out of a plurality of batteries 5 has higher power consumption. That is, it is possible to curb an increase in size of the batteries 5 as a whole. Since capacities of the batteries 5 can be efficiently used, it is possible to decrease the size of the batteries 5.

Accordingly, it is possible to provide a power supply device 1 that can curb an increase in size in comparison with the related art and equalize power consumption in a plurality of batteries 5.

The power supply device 1 includes the temporary generated electric power determining unit 69 and the comparison unit 17. The higher electric power of the first electric power calculated by the difference summing unit 16 and the second electric power calculated by the temporary generated electric power determining unit 69 is generated by the power generator 3. For example, when a sum of differences between demanded electric power and the respective charge states of the batteries 5 is large, electric power to be generated is determined based on the first electric power (the electric power difference sum D5) calculated by the difference summing unit 16. Accordingly, when a difference in demanded electric power between the power supply lines 4 is large or when a difference in charge state between the batteries 5 is large, electric power to be generated can be suitably determined. On the other hand, for example, when a total amount of demanded electric power is large or when a total charge state of the batteries 5 is low, electric power to be generated is determined based on the second electric power (the temporary electric power P6) calculated by the temporary generated electric power determining unit 69. Accordingly, it is possible to perform control with a margin in electric power. As a result, it is possible to provide a power supply device 1 with improved versatility which can be applied to various circumstances without complicating the control.

The power supply device 1 is used as a power supply of an electric propulsion flying object 10. The electric loads are the electric motors 7 for causing the propellers 8 of the flying object 10 to rotate. Here, in a flying object 10 that flies by causing a plurality of propellers 8 to rotate, unevenness in power consumption of the power supply lines 4 is likely to increase, for example, according to the weather or a posture of the flying object 10. Accordingly, particularly, when the power supply device 1 is applied to a flying object 10 with a large difference in demanded electric power for the electric loads (the electric motors 7), the power supply device can be more suitably used. That is, it is possible to equalize power consumption or respective charge states of the batteries 5.

Since electric power from the power generator 3 is distributed according to electric power used for the power supply lines 4, it is possible to easily control the flying object 10.

The technical scope of the present invention is not limited to the aforementioned embodiment and the embodiment can be modified in various forms without departing from the gist of the present invention.

In the aforementioned embodiment, a configuration in which four power supply lines 4 are connected to two power generators 3 has been described above, but the present invention is not limited thereto. For example, two power supply lines 4 may be connected to one power generator 3. That is, the first power supply line 21 and the second power supply line 22 may be connected to one power generator 3 out of two power generators 3, and the third power supply line 23 and the fourth power supply line 24 may be connected to the other power generator 3 thereof. In this case, the first power supply line 21 and the second power supply line 22 may be independent from the third power supply line 23 and the fourth power supply line 24.

The number of power generators 3 or the number of drive sources 2 is not limited to two. Similarly, the number of propellers 8 is not limited to eight. Combinations of the propellers 8 and the power supply lines 4 are not limited to the aforementioned embodiment.

In this embodiment, the demanded electric power of the airframe 19 was calculated by summing the respective demanded electric power for the first through fourth electric motors 41, 42, 43, and 44, but is not limited to this. For example, the demanded electric power of the airframe 19 may be calculated by adding the sum of the demanded electric power for the four propulsion electric motors 71, 72, 73, and 74 in addition to the sum of the demanded electric power for the first through fourth electric motors 41, 42, 43, 44.

Without departing from the gist of the present invention, elements in the aforementioned embodiment can be appropriately replaced with known elements, and the aforementioned embodiments may be appropriately combined.

EXPLANATION OF REFERENCES

1 Power supply device
2 Drive source
3 Power generator
4 Power supply line
5 Battery
6 Diode
7 Electric motor (electric load)
8 Propeller
10 Flying object
11 First difference calculating unit (difference calculating unit)
12 Second difference calculating unit (difference calculating unit)
13 Third difference calculating unit (difference calculating unit)
14 Fourth difference calculating unit (difference calculating unit)
16 Difference summing unit
17 Comparison unit
69 Temporary generated electric power determining unit
D5 Electric power difference sum (first electric power)
P1 First demanded electric power (demanded electric power)
P2 Second demanded electric power (demanded electric power)
P3 Third demanded electric power (demanded electric power)
P4 Fourth demanded electric power (demanded electric power)
P6 Temporary electric power (second electric power)
SOC1 Charge state (of first battery)
SOC2 Charge state (of second battery)
SOC3 Charge state (of third battery)
SOC4 Charge state (of fourth battery)

What is claimed is:

1. A power supply device comprising:
    a power generator;
    a drive source that drives the power generator;
    a plurality of power supply lines that supply electric power generated by the power generator to a plurality of electric loads;
    a plurality of batteries that are connected to the corresponding power supply lines upstream from the corresponding electric loads in an electric power supply direction;
    a diode that is provided upstream from the battery in the corresponding power supply line and allows electric power to flow in only one direction from upstream to downstream of the power supply line;
    a difference calculating unit configured to calculate a difference between demanded electric power in the corresponding power supply line and a charge state of the corresponding battery; and
    a difference summing unit configured to sum the differences in electric power in the power supply lines calculated by the difference calculating unit,
    wherein the drive source is controlled such that electric power equal to or higher than the electric power calculated by the difference summing unit is generated by the power generator.

2. The power supply device according to claim 1, further comprising:
    a temporary generated electric power determining unit configured to calculate an amount of electric power generated by the power generator based on the respective charge states of the plurality of batteries and the demanded electric power; and
    a comparison unit configured to compare first electric power calculated by the difference summing unit and second electric power calculated by the temporary generated electric power determining unit and to select the higher electric power of the first electric power and the second electric power, wherein the drive source is controlled such that electric power equal to or higher than the electric power selected by the comparison unit is generated by the power generator.

3. The power supply device according to claim 1, wherein the power supply device is a power supply of an electric propulsion flying object, and wherein the electric loads are electric motors for causing propellers of the flying object to rotate.

4. The power supply device according to claim 2, wherein the power supply device is a power supply of an electric propulsion flying object, and wherein the electric loads are electric motors for causing propellers of the flying object to rotate.

* * * * *